(12) United States Patent
Kawamura

(10) Patent No.: US 6,398,693 B1
(45) Date of Patent: Jun. 4, 2002

(54) LINE PRESSURE CONTROL UNIT OF AUTOMATIC TRANSMISSION

(75) Inventor: Yasutaka Kawamura, Atsugi (JP)

(73) Assignee: Nissan Motor Co., Ltd., Yokohama (JP)

( * ) Notice: Subject to any disclaimer, the term of this patent is extended or adjusted under 35 U.S.C. 154(b) by 31 days.

(21) Appl. No.: 09/672,693

(22) Filed: Sep. 29, 2000

(30) Foreign Application Priority Data

Sep. 30, 1999 (JP) .......................................... 11-278666

(51) Int. Cl.[7] .......................... F16H 61/26; G06F 17/00
(52) U.S. Cl. ......................................... 477/158; 701/61
(58) Field of Search ........................ 475/127; 477/117, 477/158, 163; 701/60, 61, 62, 63

(56) References Cited

U.S. PATENT DOCUMENTS

| | | | |
|---|---|---|---|
| 4,759,236 A | * | 7/1988 | Tezuka et al. ................. 477/49 |
| 4,949,595 A | * | 8/1990 | Shimanaka .............. 477/163 X |
| 4,967,620 A | * | 11/1990 | Shimanaka .............. 477/163 X |
| 4,999,774 A | * | 3/1991 | Tokoro et al. ................. 701/61 |
| 5,056,380 A | * | 10/1991 | Sawasaki et al. ......... 477/49 X |
| 5,089,964 A | * | 2/1992 | Morishige et al. ......... 477/45 X |
| 5,191,815 A | * | 3/1993 | Kouta ....................... 701/62 X |
| 5,776,030 A | * | 7/1998 | Minowa et al. .......... 477/158 X |
| 5,800,308 A | * | 9/1998 | Tsutsui et al. .......... 477/117 X |

FOREIGN PATENT DOCUMENTS

| | | | |
|---|---|---|---|
| JP | 06-207567 | | 7/1994 |
| JP | 406207657 | * | 7/1994 ................. 477/158 |
| JP | 406207658 | * | 7/1994 ................. 477/158 |
| JP | 08-324297 | | 12/1996 |

* cited by examiner

Primary Examiner—Charles A Marmor
Assistant Examiner—Roger Pang
(74) Attorney, Agent, or Firm—Foley & Lardner

(57) ABSTRACT

In a line pressure control unit of an automatic transmission for a vehicle which performs feedback control of a line pressure of an automatic transmission, comprising: a line pressure solenoid valve(14) which adjusts a line pressure, a sensor which detects a real line pressure and a microprocessor (17) which controls the line pressure solenoid valve. The microprocessor is programmed to: calculate a required line pressure($P_{REQ}$) according to the running state of the vehicle, calculate a target line pressure($P_{REQ^*}$) from the required line pressure($P_{REQ}$), the target line pressure($P_{REQ^*}$) being modified by a safety factor(S1) for line pressure correction, and calculate a line pressure difference($\Delta P_{ERR}$) between the required line pressure($P_{REQ}$) and the real line pressure($P_L$) and add a feedback control amount($\Delta P_{FB}$) according to the line pressure difference to the target line pressure to calculate a command line pressure($P_{L^*}$) control the line pressure valve based on the command line pressure ($P_{L^*}$).

5 Claims, 6 Drawing Sheets

LINE PRESSURE CONTROL UNIT OF AUTOMATIC TRANSMISSION

FIELD OF THE INVENTION

This invention relates to improvement of a line pressure control unit of an automatic transmission including a continuously variable transmission.

BACKGROUND OF THE INVENTION

An automatic transmission comprising a continuously variable transmission such as a toroidal continuously variable transmission and a V belt continuously variable transmission for vehicles, controls speed change by oil pressure, and controls a line pressure which is an oil pressure acting on an oil pressure circuit, as a base pressure.

Tokkai Hei 8-324297 published by the Japanese Patent Office in 1996 discloses a control method wherein a line pressure a required line pressure for the automatic transmission is multiplied by a constant safety factor to calculate a target line pressure.

Further, Tokkai Hei 6-207567 published by the Japanese Patent Office 1994 discloses a method wherein a real line pressure is feedback controlled to the above-mentioned target line pressure.

SUMMARY OF THE INVENTION

The idea of performing feedback control of the line pressure by multiplying the required line pressure for control of an automatic transmission by a constant safety factor to give a target line pressure, can easily be inferred from the two above-mentioned examples of the prior art.

When setting the safety factor as a fixed value to determine the target line pressure, the setting of the safety factor must be based on the maximum value of variation. However, with such a setting, the safety factor becomes a large value and this causes a pump drive load to increase under feedback control.

It is therefore an object of this invention to provide a line pressure control unit for an automatic transmission for a vehicle which controls a line pressure so that the pump drive load is small under feedback control.

In order to achieve above object, this invention provides a line pressure control unit of an automatic transmission for a vehicle which performs feedback control of a line pressure of an automatic transmission, comprising: a line pressure solenoid valve which adjusts a line pressure, a sensor which detects a real line pressure, and a microprocessor which controls the line pressure solenoid valve, the microprocessor being programmed to: calculate a required line pressure according to the running state of the vehicle, calculate a target line pressure from the required line pressure, the target line pressure being modified by a safety factor for line pressure correction, and calculate a line pressure difference between the required line pressure and the real line pressure, and add a feedback control amount according to the line pressure difference to the target line pressure to calculate a command line pressure, control the line pressure valve based on the command line pressure.

DETAILED DESCRIPTION OF THE INVENTION

Figure 1:
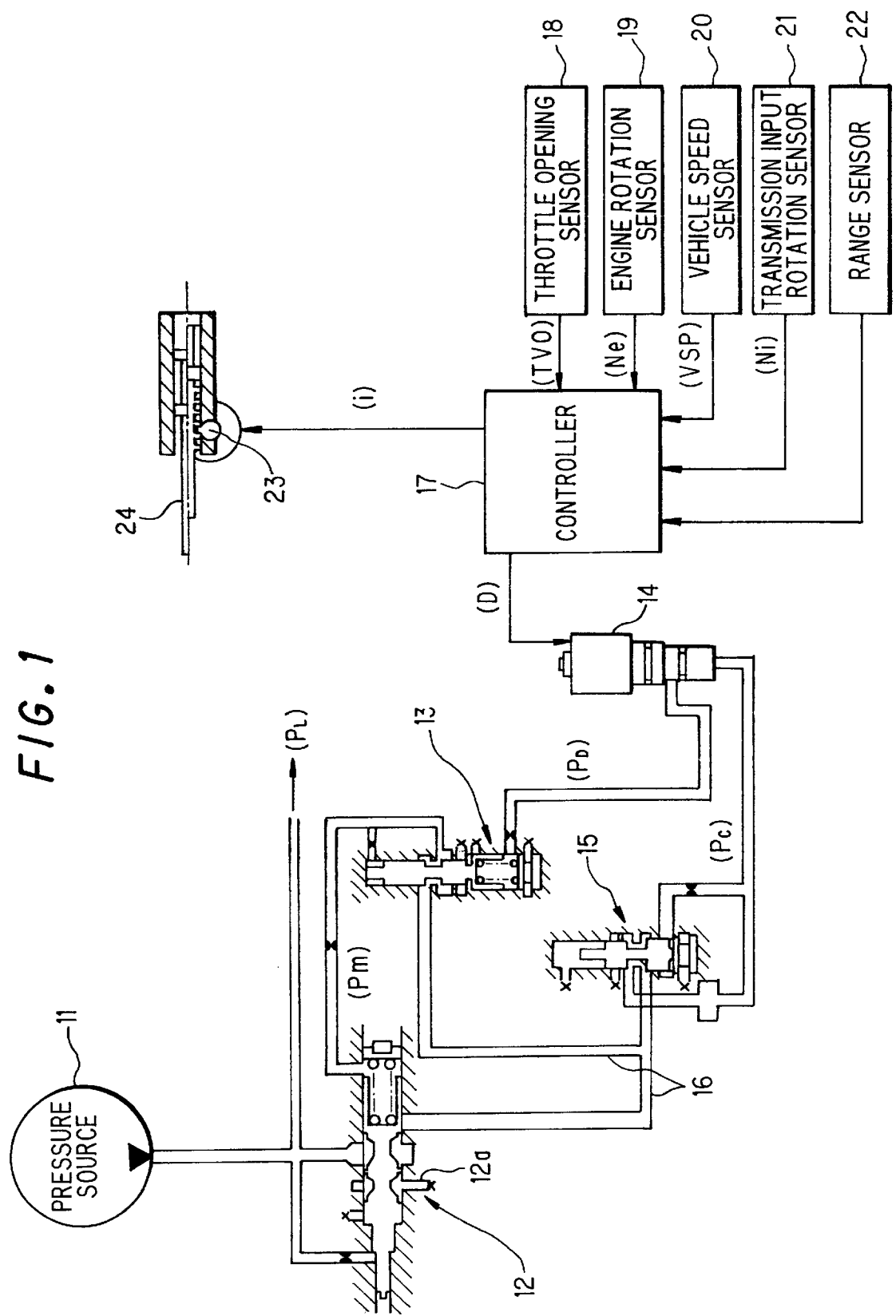
FIG. 1 is a schematic diagram of a line pressure control unit of an automatic transmission according to this invention.

Referring to FIG. 1a a line pressure control unit of an automatic transmission according to this invention comprises a pressure source 11 such as a pump, pressure regulator valves 12 and 13, a line pressure solenoid valve 14, and a pilot valve 15.

The pressure source 11 is driven by an engine. The pressure regulator valve 12 discharges oil from the pressure source 11, from a circuit 16 or drain port 12a, and adjusts it to a line pressure PL corresponding to a modified pressure Pm.

A pilot valve 15 adjusts leakage oil from the circuit 16 to a fixed pressure Pc, and supplies it to a line pressure solenoid valve 14.

The line pressure solenoid valve 14 sets the fixed pressure Pc to a duty ratio PD according to a drive duty D, and supplies it to the pressure regulator valve 13.

The pressure regulator valve 13 sets a leakage oil from the circuit 16 to a modified pressure Pm according to drive duty D of the line pressure solenoid valve 14 from a circuit 16 according to duty ratio PD, supplies this to the pressure regulator valve 12, and performs a control of a line pressure PL.

The line pressure PL is controllable in the increase or decrease direction by adjusting the drive duty D of the line pressure solenoid valve 14. The drive duty D is determined by the controller 17 as described later.

The controller 17 is provided with a microprocessor and performs line pressure control and speed change control.

The controller 17 inputs a signal from a throttle opening sensor 18 which detects an engine throttle opening TVO which represents the engine load, a signal from an engine rotation sensor 19 which detects an engine speed Ne, a signal from a vehicle speed sensor 20 which detects a vehicle speed VSP, a signal from a transmission input rotation sensor 21 which detects a transmission input rotation speed Ni input to the automatic transmission from a torque converter between the engine and the transmission, and a signal from a range sensor 22 which detects the selection range of the automatic transmission.

The controller 17 calculates a target transmission input rotation speed from the throttle opening TVO detected by sensors 18, 20, the vehicle speed VSP, and a predetermined speed change control map.

A speed ratio command i corresponding to this is sent to a step motor 23.

Due to this command, the step motor 23 has a predetermined rotation position. Next, the step motor 23 moves a speed ratio control valve body 24 to a position corresponding to the speed ratio command i. The speed ratio control valve body 24 in a predetermined position varies the speed ratio of the automatic transmission to a speed ratio corresponding to the speed ratio command i.

Regarding line pressure control, the controller 17 outputs the drive duty D of the line pressure solenoid valve 14 to the line pressure solenoid valve 14. The computation of the drive duty D of the line pressure solenoid valve 14 will now be described referring to FIG. 2.

Figure 2:
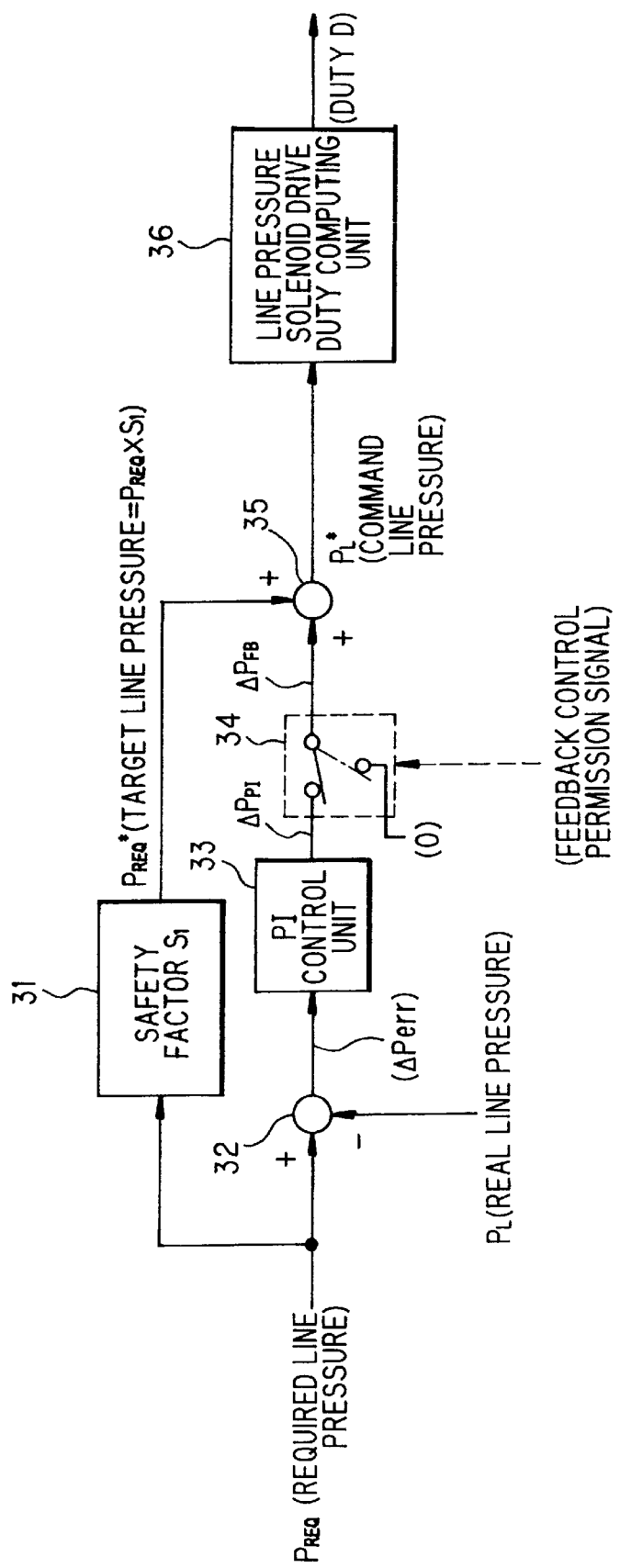
FIG. 2 is a block diagram which describes the control details of a control unit of a controller which controls line pressure.

The controller 17 comprises the processing units of a block 31, subtractor 32, PI control unit 33, change-over device 34, adder 35 and a line pressure solenoid drive duty computing unit 36, as shown in FIG. 2. These processing units are virtual units for describing the function of the controller 17 which comprises a microprocessor, and do not exist physically.

First, a required line pressure $P_{REQ}$ is calculated according to the running state of the vehicle. Next, the required line pressure $P_{REQ}$ is multiplied by a safety factor S1 for line pressure compensation by the block 31 to calculate a target line pressure $P_{REQ*}$.

Figure 5:
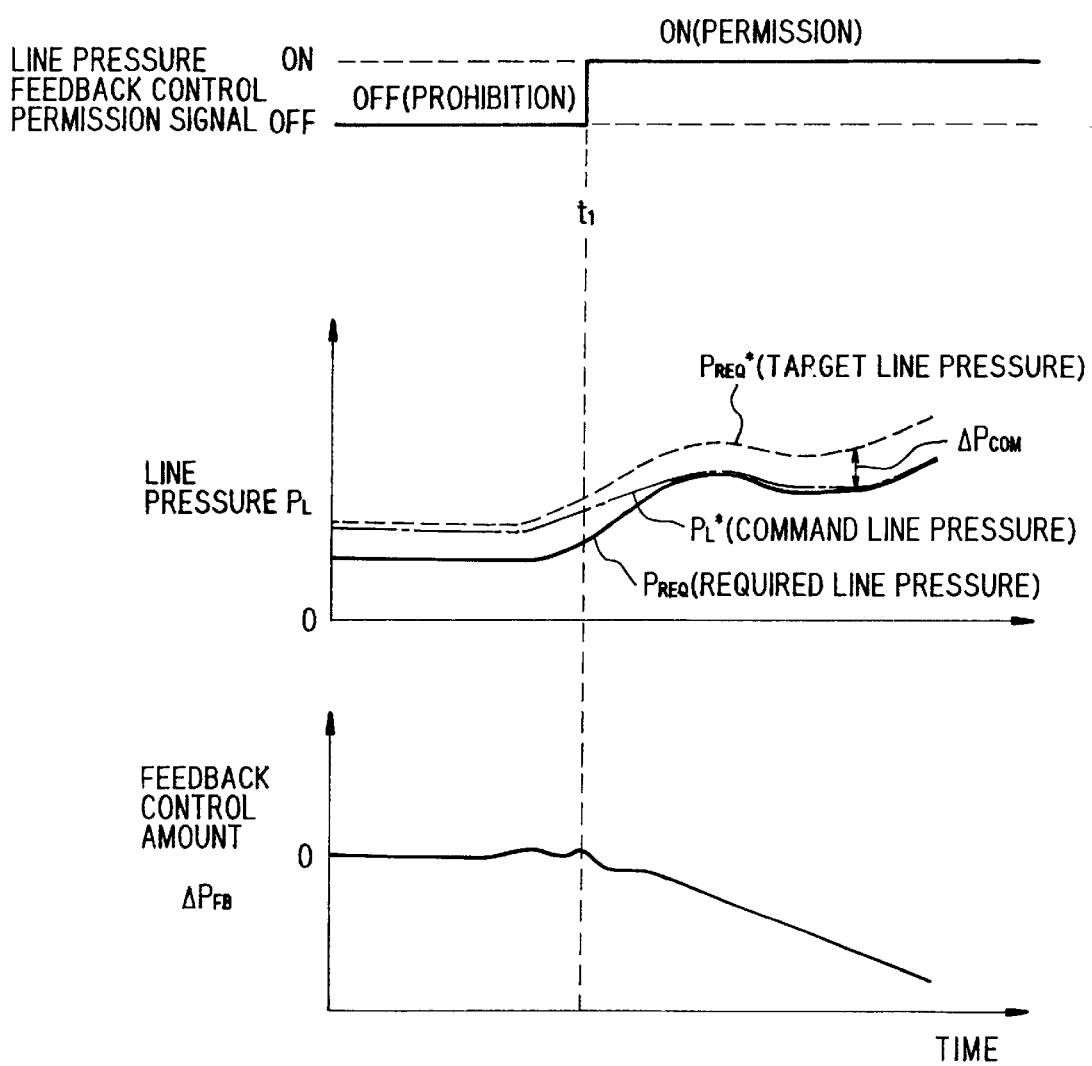
FIG. 5 is a timing chart which shows an example of an operation time chart in line pressure control.

As shown in FIG. 5, the safety factor $S_1$ is intended to add a line pressure compensation part $\Delta P_{COM}$ to the required line pressure $P_{REQ}$ which maintains a predetermined line pressure even if there is variation in the line pressure characteristics.

In the subtractor 32, a line pressure difference $\Delta P_{err}$ ($=P_{REQ}$-$P_L$) between the required line pressure $P_{REQ}$ and a real line pressure $P_L$ is computed. In the PI control unit 33, a well-known PI computation based on the line pressure difference $\Delta P_{err}$ is performed, and a control amount $\Delta P_{PI}$ is calculated according to the line pressure difference $\Delta P_{eer}$.

In the change-over device 34, when a feedback control permission signal output by the controller 17 is present, a switch connects the PI control unit 33 and the adder 35, and the PI control amount $\Delta P_{PI}$ is set as a feedback control amount $\Delta P_{FB}$.

When the feedback control permission signal is not output, the switch does not connect the PI control unit 33 and the adder 35, and sets the feedback control amount $\Delta P_{FB}$ to zero.

Here, the state where this feedback control permission signal is not output is the case where the controller 17 detects a state where the sensor which detects a running state has a malfunction or an error occurs so that feedback control of the line pressure is impossible. The feedback control permission signal is not output also immediately after the selection has changed over from the non-running range to the running range, when the feedback control of line pressure is unstable. Apart from in these states, the controller 17 outputs the feedback control permission signal.

In the adder 35, the feedback control amount $\Delta P_{FB}$ is added to the target line pressure $P_{PEQ*}$ to calculate the command line pressure $P_{L*}$.

In the line pressure solenoid drive duty computing unit 36, the duty D which is a line pressure control command is determined so that the command line pressure $P_{L*}$ is attained, and this is output to the line pressure solenoid valve 14 of FIG. 1.

Figure 3:
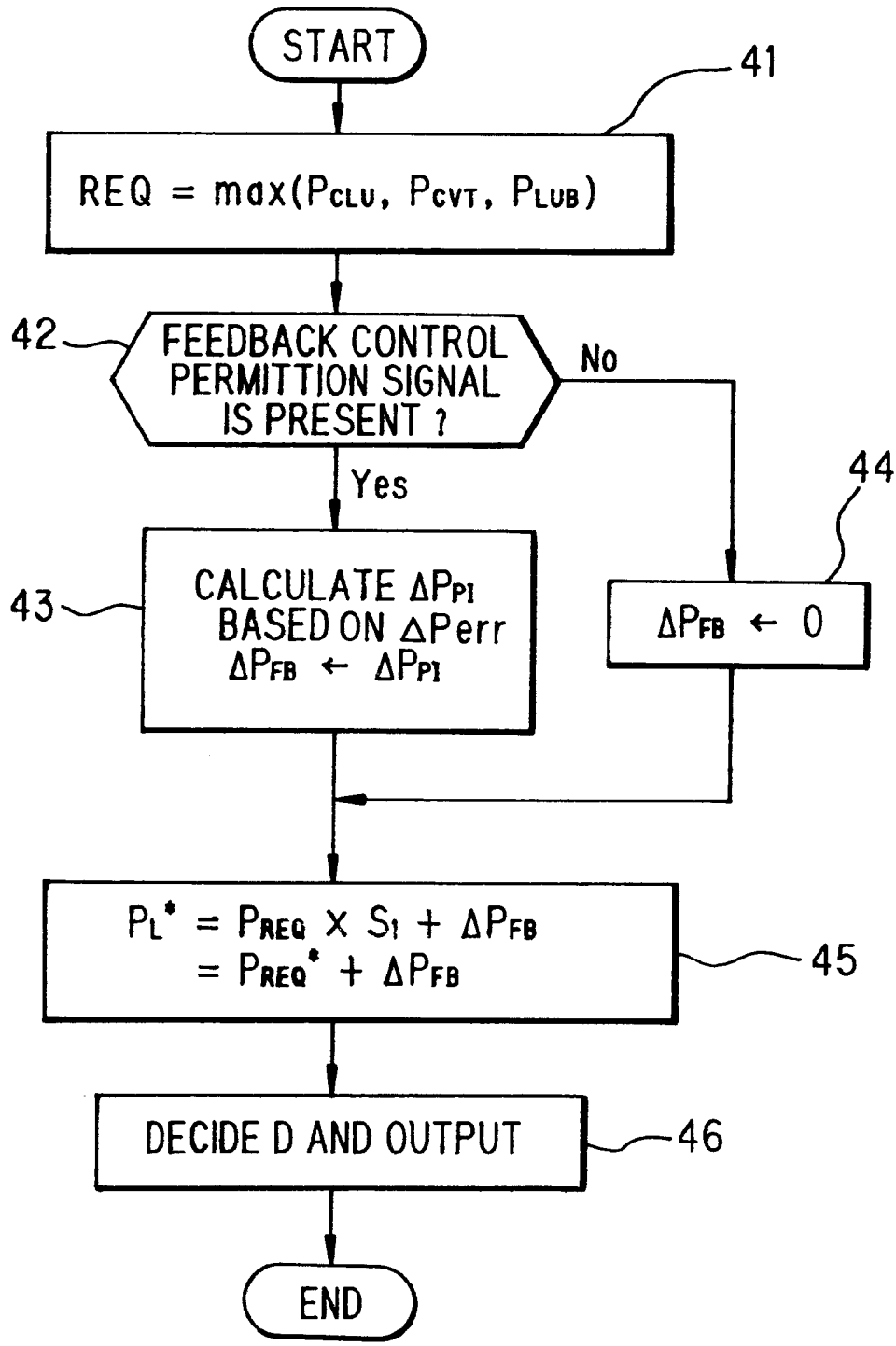
FIG. 3 is a flowchart which shows a line pressure control program of the controller.

The line pressure control program performed by the controller 17 is shown in FIG. 3.

In a step S41, a required clutch pressure $P_{CLU}$ for engaging of the clutch of the toroidal continuously variable transmission or a brake, a required speed change pressure $P_{CVT}$ to perform speed change of the continuously variable transmission, and a required lubrication pressure $P_{LUB}$ to perform lubrication of the continuously variable transmission are computed, and the maximum value of these parameters ($P_{CLU}$, $P_{CVT}$, $P_{LUB}$) is set to the required line pressure $P_{REQ}$.

The required clutch pressure $P_{CLU}$ is computed from the speed ratio e=Ne/Ni of the torque converter between the engine and the transmission based on the engine rotation speed Ne and transmission input rotation speed Ni. A torque ratio t is looked up from a torque converter performance chart based on this speed ratio e. Further, the transmission input torque Ti=Text is calculated from the torque ratio t by multiplying the engine torque Te calculated from the engine rotation speed Ne and the throttle opening $T_{VO}$ by the torque ratio t based on an engine performance chart. The minimum pressure at which the aforementioned clutch does not slide slip even with this transmission input torque Ti, is taken as the required clutch pressure $P_{CLU}$.

The required speed change pressure $P_{CVT}$ is found by determining the input rotation speed ratio of the transmission from the engine rotation speed Ni and vehicle speed VSP corresponding to the speed ratio output rotation speed, i.e., the speed ratio i, and taking the pressure corresponding to the speed ratio i for every transmission input torque Ti as the required speed change pressure $P_{CVT}$.

The required lubrication pressure $P_{LUB}$ is computed by adding a coefficient $K_2$ as an offset value to a value obtained by multiplying the transmission input torque Ti by a coefficient $K_1$.

In a step S42, it is determined whether or not a feedback control permission signal is present.

When it is present, in a step S43, the processing mentioned above regarding the subtractor 32, PI control unit 33 and change-over device 34 of FIG. 2 is performed.

Specifically, the line pressure difference $\Delta P_{err}=P_{PEQ}-P_L$ the between required line pressure $P_{REQ}$ and the real line pressure $P_L$ is first computed.

The well-known PI computation is performed based on the line pressure difference $\Delta P_{err}$, and the PI control amount $\Delta P_{PI}$ is calculated according to the line pressure difference.

This PI control amount $\Delta P_{PI}$ is set as the feedback control amount $\Delta P_{FB}$.

When the feedback control permission signal is not present in the step S42, the routine proceeds to a step S44 and the feedback control amount $\Delta P_{FB}$ is set to 0.

The state where the feedback control permission signal is not present is the case where the controller detects a state where the sensors 18-21 which detect the running state of the vehicle has a malfunction or an error occurs so that feedback control of line pressure is impossible, as in the case of the aforesaid change-over device 34. Further, the controller 17 does not output a feedback control permission signal also during the interval immediately after the automatic transmission was changed over to the running range from the non-running range, and line pressure feedback control is unstable.

In a step S45, the same processing as the block 31 and the adder 35 of FIG. 2 is performed.

Specifically, the target line pressure $P_{PEQ*}$ is calculated by multiplying the required line pressure $P_{REQ}$ by the safety factor $S_1$, and the feedback control amount $\Delta P_{FB}$ is added to the target line pressure $P_{PEQ*}$ to calculate the command line pressure $P_{L*}$.

In a step S46, in the same way as the line pressure solenoid drive duty computing unit 36 of FIG. 2, a duty D which is a line pressure control command is determined so that the command line pressure $P_{L*}$ is attained, and this is output to the line pressure solenoid valve 14 of FIG. 1.

According to the aforesaid line pressure control, the target line pressure $P_{PEQ*}$ is obtained by adding a line pressure compensation part $\Delta P_{COM}$ due to the safety factor $S_1$ to the required line pressure $P_{REQ}$, as is shown in FIG. 5.

During the interval until a feedback control start time t1 when the feedback control permission signal is output, the switch of the change-over device 34 of FIG. 2 does not connect the PI control unit 33 and the adder 35.

In the step S42 of FIG. 3, the step S44 is selected and the feedback control amount $\Delta P_{FB}$ is set to 0.

Therefore, as shown in FIG. 5, the command line pressure $P_{L^*}$. becomes the same as the target line pressure $P_{REQ}$.

The line pressure $P_L$, which is controlled to comply with the command line pressure $P_{L^*}$, is therefore controlled so that it follows the target line pressure $P_{PEQ^*}$ which is set higher than the required line pressure $P_{REQ}$ by the line pressure compensation part $\Delta P_{COM}$ taking account of the safety factor $S_1$.

When the feedback control permission signal is not output, line pressure control is continuously performed by feed forward control using $\Delta P_{FB}=0$.

Therefore, line pressure control is does not become impossible unstable, and feed forward control can be performed using the feedback control system without modification.

During feed forward control, the line pressure $P_L$ is controlled to follow the target line pressure $P_{PEQ^*}$ which is set higher than the required line pressure $P_{REQ}$ by the line pressure compensation part $\Delta P_{COM}$. Therefore, even there is a variation in line pressure characteristics as shown in FIG. 6, poor control of the automatic transmission due to shortage of the line pressure $P_L$ does not occur.

After outputting the feedback control permission signal at the time tl in FIG. 5, the change-over device 34 of FIG. 2 connects the PI control unit 33 and the adder 35. Also, the step S43, S42 in FIG. 3 selects the step S42, S43, and the feedback control amount $\Delta P_{FB}$ is set to the PI control amount $\Delta P_{PI}$.

Figure 6:
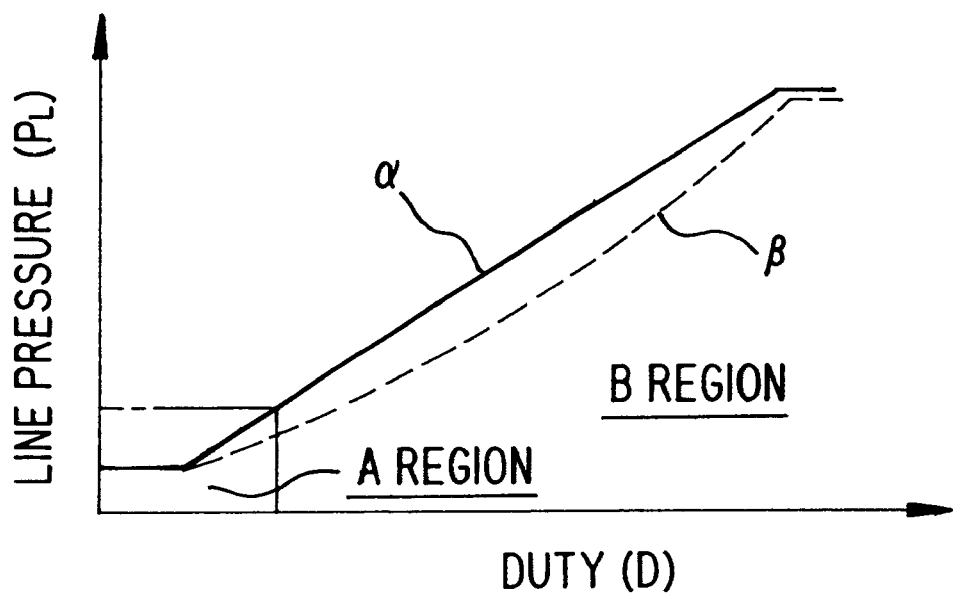
FIG. 6 is a line pressure characteristic diagram showing a variation in the line pressure relative to a drive duty of a line pressure solenoid.

Feedback control is started under these conditions, and the feedback control gradually eliminates the line pressure shortage due to the variation in line pressure characteristics of FIG. 6.

As a result, the feedback control amount $\Delta P_{FB}$ decreases (its negative absolute value becomes large) as shown in FIG. 5.

Therefore, the controller 17 makes the command line pressure $P_{L^*}$ gradually approach the target line pressure $P_{REQ}$ at which the safety factor $S_1$ is not considered, from the high target line pressure $P_{PEQ^*}$ at which the safety factor $S_1$ is considered, until they finally coincide.

Therefore, the line pressure $P_L$ controlled to comply with the command line pressure $P_{L^*}$, is also controlled to gradually approach the target line pressure $P_{REQ}$ at which the safety factor $S_1$ is not considered, from the high target line pressure $P_{PEQ^*}$ at which the safety factor $S_1$ is considered, and finally to follow it.

Therefore, the command line pressure $P_{L^*}$ to cancels shortage of the line pressure $P_L$ due to the variation of line pressure characteristics in the figure during feedback control, line pressure control considering the safety factor $S_1$ is unnecessary.

Moreover, even if there is variation in line pressure characteristics, poor control of the automatic transmission due to shortage of line pressure does not occur.

During feedback control, the line pressure $P_L$ is controlled to follow the low target line pressure $P_{REQ}$ at which the safety factor $S_1$ is not considered, so increase of the line pressure $P_L$ by the line pressure compensation part $\Delta P_{COM}$ is prevented from becoming unnecessarily high.

Therefore, the problem of the pump drive load becoming larger leading to poorer fuel cost-performance, and the disadvantageous of noise or vibration during this period can be resolved.

However, if there is an error in the sensor information used to calculate the required line pressure $P_{REQ}$, or an error arises in the computation leading to an error in the required line pressure $P_{REQ}$, shortage of line pressure control is not eliminated by the aforesaid embodiment.

Figure 4:
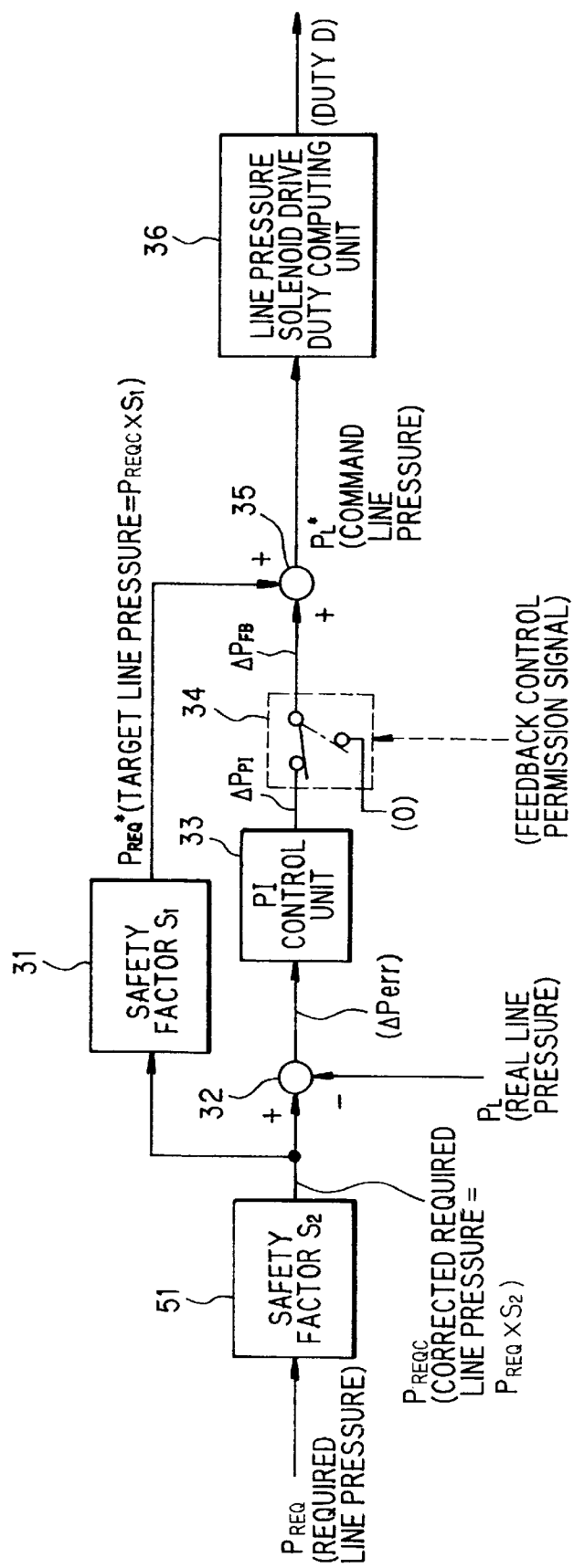
FIG. 4 is similar to FIG. 2, but is a block diagram describes other control details of the control unit of the controller.

The second embodiment aims to resolve this problem by adding a block 51 to the construction of FIG. 2, as shown in FIG. 4.

The block 51 multiplies the required line pressure $P_{REQ}$ by a safety factor for a required line pressure correction $S_2$ to correct for error, and calculates a corrected required line pressure $P_{REQC}$.

The corrected required line pressure $P_{REQC}$ is used for the line pressure control shown in FIGS. 2 and 3 instead of the required line pressure $P_{REQ}$.

According to this embodiment, the error inherent in the required line pressure $P_{REQ}$ can also be rectified.

Therefore, an error of line pressure control resulting from an error in the required line pressure is also avoided.

The contents of Japanese Application No. 11-278666 and No. 11-278667, with a filing date Sep. 30, 1999, are hereby incorporated by reference.

The embodiments of this invention in which an exclusive property or privilege is claimed are defined as follows:

1. A line pressure control unit of an automatic transmission for a vehicle which performs feedback control of a line pressure of an automatic transmission, comprising:
   a line pressure solenoid valve which adjusts a line pressure,
   a sensor which detects a real line pressure, and
   a microprocessor which controls the line pressure solenoid valve, the microprocessor being programmed to:
   calculate a required line pressure according to the running state of the vehicle,
   calculate a target line pressure from the required line pressure, the target line pressure being modified by a safety factor for line pressure correction, and
   calculate a line pressure difference between the required line pressure and the real line pressure, and add a feedback control amount according to the line pressure difference to the target line pressure to calculate a command line pressure,
   control the line pressure valve based on the command line pressure.

2. A line pressure control unit of an automatic transmission as defined in claim 1, wherein the line pressure control unit is provided with sensors which detects the running state of the vehicle, and the microprocessor is programmed to determine the need for feedback control based on the detection value of the sensors, and to make a feedback control amount zero when feedback control is unnecessary so as to prohibit feedback control.

3. A line pressure control unit of an automatic transmission as defined in claim 2, wherein the microprocessor is programmed to detect a malfunction or abnormality of the sensors, and prohibit feedback control when a malfunction or abnormality is detected.

4. A line pressure control unit of an automatic transmission as defined in claim 2, wherein the line pressure control unit comprises a range sensor which detects a selection range of the automatic transmission, and the microprocessor is programmed to determine a change-over of the selection range based on the detection value of the range sensor, and prohibit feedback control during a predetermined interval immediately after changing over to a running range from a non-running range.

5. A line pressure control unit of an automatic transmission as defined in claim 1, wherein the microprocessor is programmed to use a corrected required line pressure, calculated by modifying the required line pressure according to the vehicle running state by a safety factor required to correct an error in the required line pressure, as the required line pressure used for line pressure control.

* * * * *